July 7, 1942.  W. H. GLAZER  2,288,697

PRISMOMETER

Filed Feb. 15, 1940  3 Sheets-Sheet 1

INVENTOR
WILLIAM H. GLAZER
BY
Harry Langsam
ATTORNEY

July 7, 1942. W. H. GLAZER 2,288,697
PRISMOMETER
Filed Feb. 15, 1940 3 Sheets-Sheet 2
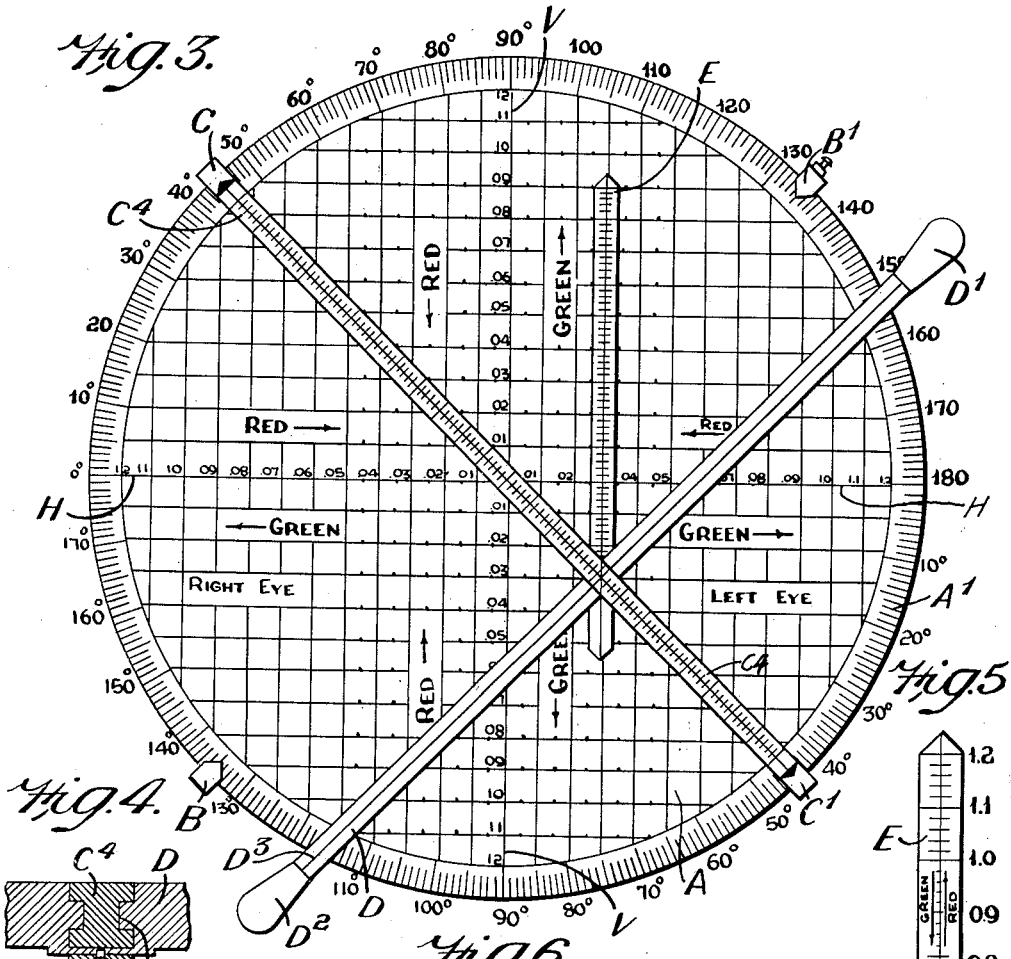
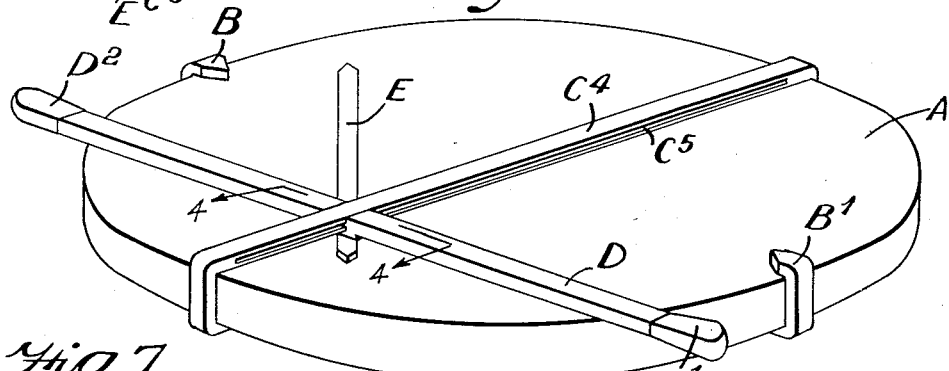
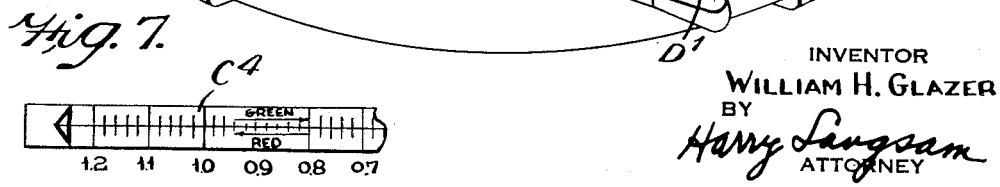
INVENTOR
WILLIAM H. GLAZER
BY
Harry Sangsam
ATTORNEY

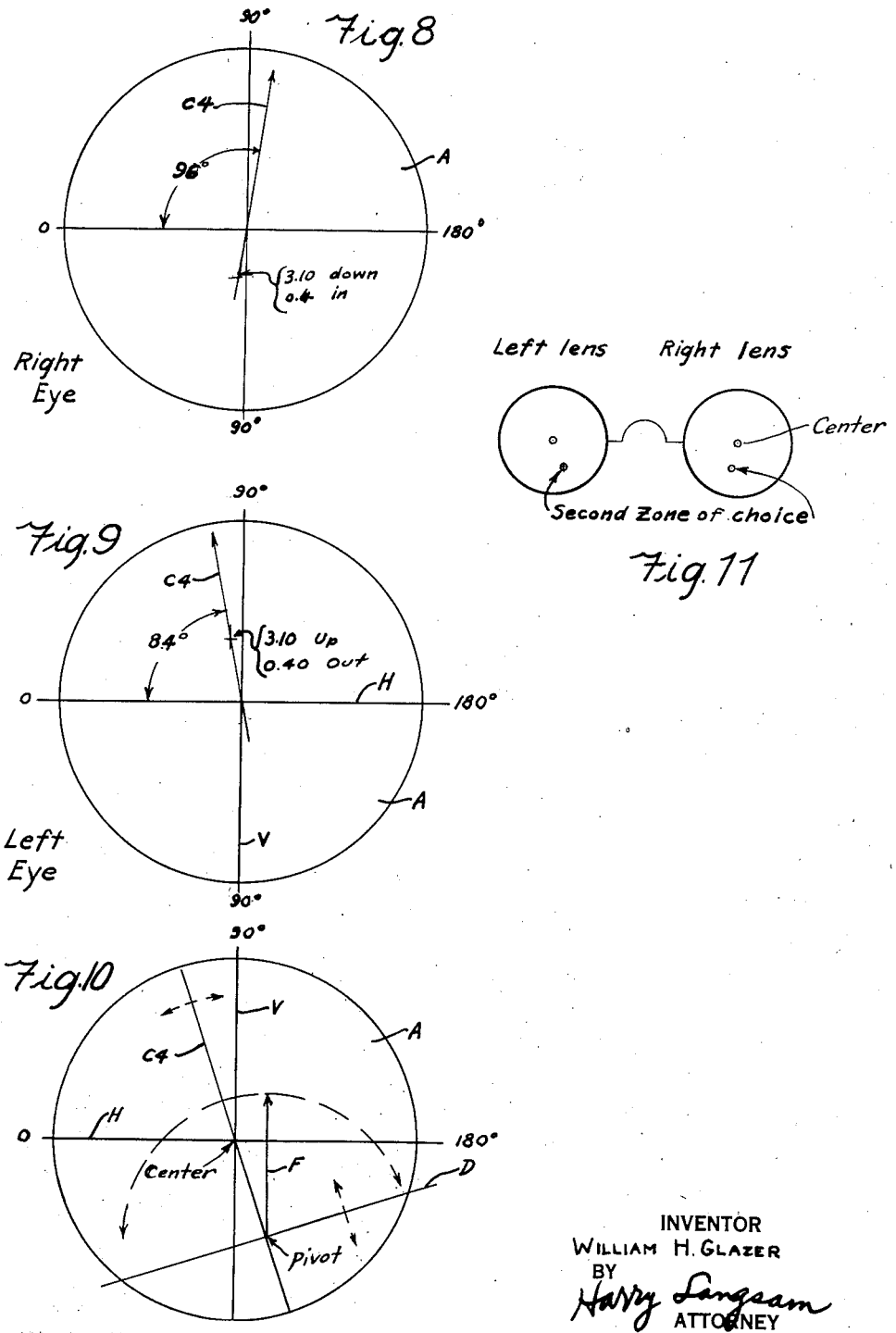

Patented July 7, 1942

2,288,697

UNITED STATES PATENT OFFICE 2,288,697

PRISMOMETER

William H. Glazer, Philadelphia, Pa.

Application February 15, 1940, Serial No. 319,070

5 Claims. (Cl. 235—61)

My invention relates particularly to bifocals and relates generally to ophthalmic lenses for the purpose of obtaining one or more visual zones of binocular use other than, and in addition to, the ordinary, normal central zone of binocular use.

An ophthalmic lens may consist of a sphere, a cylinder, a prism, or any combination of these elements in both positive and negative powers, the cylindric and the prismatic elements being each capable of a further combination by placement into any meridian of the entire circle; and the additional combination of the prism, for ophthalmic purposes, must specify the direction in which the base of the prism must lie. There may be a further combination by the addition of simple spherical and sphero-prismatic powers for what is known popularly as "bifocals," that is, a lens having two foci.

Due to the vast possible number of combinations, not only of one eye but for two eyes, physiologically intimately related, certain different effects will arise, and must arise, from the nature of the eye defects of both eyes and from the nature of the correcting lens elements as may cause a patient great discomfort, and at times cause actual pain, loss of appreciable sight in a particular eye, and to a condemnation of an entire visual area of the brain to physical and psychophysical changes, affecting the very personality, safety and competence of a patient.

The first effects may be regarded as due to muscular strain caused by unequal prismatic effects in the so-called reading portions of a lens, or bifocal area. This is probably the most serious and least understood of all bifocal complaints. Very often, two different pairs of single vision lenses are prescribed, because a comfortable, efficient correction with bifocals has not been successful.

I shall show that where a presbyopic correction (so-called old-age sight aid) is complicated by the presence of unequal powers of the distance correction by dissimilar or unequal powered cylinders, by unequal reading additions, or by a combination of these elements, the bifocals of any type now used become unwearable—the interplay of the extra-ocular muscles are prevented from normal, physiologic performance, and cause preventable strains that occur when the eyes leave the geometrical centers of the distance portions and seek to function binocularly at "visual points" down into the reading portions. As in single vision lenses, the patient can obtain comfortable binocular sight only within two small "visual zones" surrounding the two geometrical centers of the lenses. For bifocal, or other purposes, he can at best only hope to obtain a pair of similar and corrected visual zones in the particular zone of use, as in the reading portions.

Such a patient can only satisfy aesthetic desires by juggling two separate pairs of glasses if he will not have recourse to the final purpose for which my instrument and method will accomplish.

If a different prismatic force is exerted on one eye than on the other, as is certain to happen where the form and nature of the error of refraction is more or less in one eye than in another of the same pair, fusion of the two retinal images into a single brain image will be a matter of difficulty up to a certain limit beyond the optical centers of the prescribed lenses; and it will be wholly impossible to achieve a single brain image from two retinal images beyond that certain limit. Hence, a pair of glasses, and especially a pair of bifocals, must always be considered and designed as a binocular optical instrument. To perform its intended functions correctly, it must fit in exactly as a component of the human visual system—as a humanly designed component of this, the most complicated and least understood optical agency known to man.

Heretofore, the presumption of the refractionist has not been sufficient to overcome the difficulties hereinbefore set forth; and the only way such difficulties could be corrected was by involved or somewhat complex mathematical calculations for determining the prismatic effects of an ophthalmic lens away from its true optical and geometric center.

I have devised a method and a system embodying simple algebraic and vector additions in combination with the utilization of my instrument, illustrated in the drawings, for analyzing the prismatic effects of each component part of an ophthalmic lens at any set of rectangular coordinates, designated for binocular use, in the vertical and in the horizontal meridians intersecting these coordinates. The analysis shows the magnitude of the prismatic effect of each element and the direction of the prismatic base for the vertical and for the horizontal meridians at the center of any visual zone of particular choice.

Having determined the total prismatic effects of the components of each prescribed lens, consisting of a sphere, cylinder and/or prism-by-phoria elements, or any combinations thereof, the further purpose of the instrument is to determine the single equivalent prism that will neutralize the vertical and horizontal prismatic differences, thereby establishing a balanced pair of visual zones chosen to serve a particular purpose away from the geometric and optical centers of the prescribed lenses. Moreover, the setting for this equivalent resultant prism will at once show the proper placement, as to meridian, of the base-apex line of that equivalent and correcting prism. The ultimate purpose of the whole is to achieve binocular single vision into any one or more zones of choice away from the optical and geometric centers (they are usually co-incident) of a pair of ophthalmic lenses or lens systems intended to correct human visual and muscular defects restoring normal, physiologic coordination.

The instrument, then, has the double purpose of analyzing the prismatic effects of a sphere, and particularly the prismatic effects of an oblique ophthalmic cylinder; and then to synthesize the prismatic total differences in the corresponding mutually perpendicular sections of the two ophthalmic lenses intended to produce single, binocular vision with physiologic ease; also, the proper setting as to meridian along which the base-apex line must fall, so that balanced prismatic effects at the centers of zones of visual choice away from the geometric and optical centers shall so occur as to permit safe, comfortable, single binocular vision and to obviate the stresses, distresses and reflexly harmful effects to the eyes and to the very person.

It is, therefore, an object of my invention to achieve binocular single vision into any one or more zones of choice to correct human vision and muscular defects.

Another object of my invention is to simplify the complex calculations which heretofore have been necessary.

Other objects of my invention are to provide an improved device of the character described, that is easily and economically produced, which is sturdy in construction and which is highly efficient in operation.

With the above and related objects in view, my invention consists in the following details of construction and combination of parts, as will be more fully understood from the following description, when read in conjunction with the accompanying drawings, in which:

Fig. 3 is another view of Fig. 1 but wherein the movable arms have been swung a distance of approximately 90° from the position of the arms illustrated in Fig. 1.

Fig. 4 is a sectional view taken on the line 4—4 of Fig. 6.

Fig. 5 is an enlarged view of the scale on the rotatable arm of the instrument graduated into conversion units wherein ¼″ is the equivalent of a conversion unit of 0.1 centimeter.

Fig. 6 is a perspective view of the front of the vector calculating instrument illustrated in Figs. 1 and 2.

Fig. 7 is an enlarged view of the scale on the power arm of the instrument graduated into fifth portions of an inch.

Fig. 8 is a schematic view of the instrument for obtaining the resultant lens values of Example I.

Fig. 9 is a second schematic view of the instrument for obtaining the resultant lens value of the problem set forth in the data of Example II.

Fig. 10 is a schematic view of the instrument having arrows thereon to indicate the direction in which the various elements may move.

Fig. 11 is a schematic view of a pair of eyeglass lens showing the central zone of vision and a secondary cycle of choice of vision.

Before giving a concrete example of my invention and the calculations which it will achieve, I shall describe the instrument illustrated in Figs. 1 to 7 so that a coordinated, logical analysis of the invention will be understood. A knowledge of my instrument and its application presupposes certain fundamental professional knowledge, as will become evident hereinafter.

Figure 1:
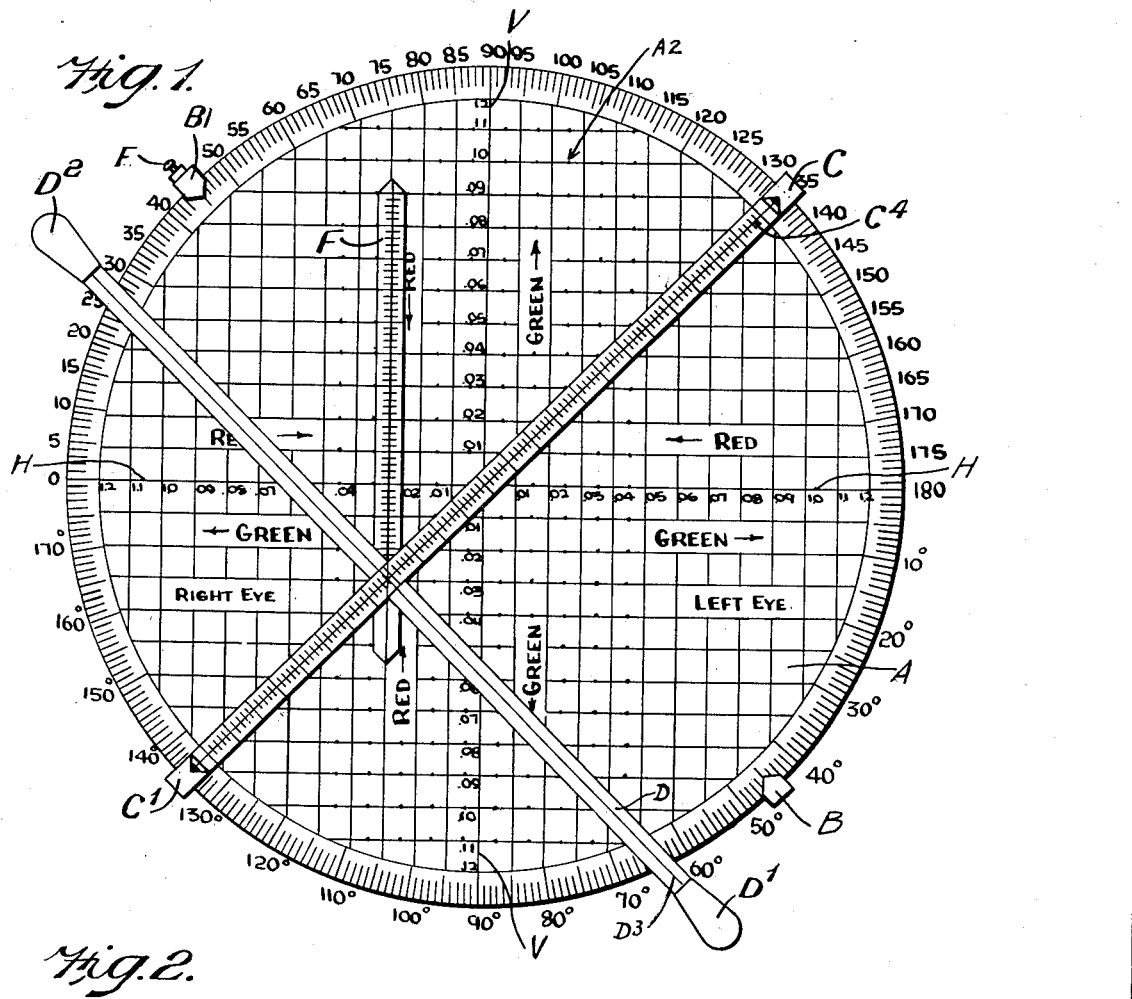
Fig. 1 is a plan view of an instrument embodying a portion of my invention.
Figure 2:
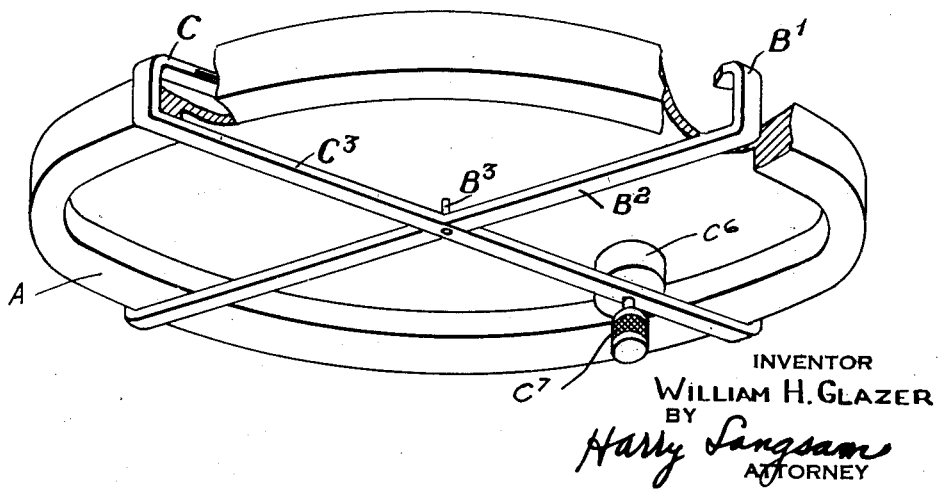
Fig. 2 is a perspective view of Fig. 1 showing the back view of my invention.

Referring to Fig. 1, I show my instrument embodying a circular plate, generally designated as A, which may be made of suitable opaque material. The plate has a radius of three (3) inches and is carefully ruled to squares one-fourth (¼) inch on each side. Two mutually perpendicular lines, H and V, are diameters of the plate A and are special lines of reference. The center of the plate is plainly marked as a particular point of reference. Along lines H and V, to the right and to the left, also above and below the lines, are the numerals reading 0.1, 0.2, 0.3 . . . 1.10, 1.20, indicating centimeter units. The instrument units are not measured in centimeters directly but are coordinated in relative units. The squares may be subdivided into sub-intervals of 0.01 centimeter by dividing the squares into 1/20 inch intervals. Around the periphery of the plate A, a scale ($A_1$) divides the circle in degrees and half-degrees from 0° to 180° in the upper semi-circle, clockwise; and from 180° to 0° in the lower semi-circle, counterclockwise, from the same point 0° as origin.

The lower right half quadrant is for the left eye as the reader views Figs. 1 and 3, and the left lower quadrant is for the right eye. For convenience, two different colors may be used, one color signifying the right eye, and the other color signifying the left eye. That is, the semi-circle to the right of the V line may be one color, and the semi-circle to the left of the V line may be another color. Each square to the right and left of the 90° meridian for each of the five squares may have a dot or suitable mark of equal division along the horizontal of each square, as designated in $A_2$.

On the front of the plate are two pointers, designated as B and $B_1$, and the pointers move over the peripheral scale $A_1$. The pointers B and $B_1$ are joined by a connecting member $B_2$ on the under surface of the instrument, and the connecting member is pivotally joined to the plate A at $B_3$, see Fig. 2. Rigidly secured to the connecting member $B_2$ is a second diameter $C_3$, which is positioned at 90° to the connecting member $B_2$. The member $C_3$ is continuous to index members C and $C_1$ on the front of the plate and to a power arm $C_4$ having a transparent scale thereon marked in a tenth portion of a unit of a quarter of an inch and subdivisions of fifths of a unit. The diameter $C_4$ is scaled in the following units: one-quarter (¼) inch and sub-intervals at one-twentieth (1/20) inch starting from the center of the arm $C_4$. Hence, one-quarter (¼) inch equals 0.1 unit.

It should be observed that the scale portion of power arm $C_4$ has its center at the diametral center of the plate A. Hence, rotation about the point $B_3$ will cause a rotation of the member $C_4$. The arm $C_3$ may be rotated by means of the friction or gear member $C_6$ engaging the inner surface of the circular plate A when handle $C_7$ is turned or revolved.

The unit one-quarter (¼) of an inch is the equivalent of 0.1 centimeter, or one millimeter, on all scales of the instrument for the purpose of easy conversion. The sub-division one-twentieth (1/20) of an inch represents 0.02 centimeter, or 0.2 millimeter, on all scales of the instrument. The hair-lines of any arm that intersect a scale between two sub-divisions will give an interpolated reading of k/1000 of a centimeter, or k/100 of a millimeter.

Thus, it is seen that the physical construction of the power arm $C_4$ is contiguous to the rear parallel arm $C_3$. The front power arm $C_4$ has a transverse slot therein, designated as $C_5$, in which a cross rod, generally designated as D, slides. The rod D has handles, designated as $D_1$ and $D_2$, at each end thereof.

It should be observed that the slot $C_5$ extends a distance substantially equal to the diameter of the plate A so that the arm D may slide from one side of the plate to the diametrically opposite end of the plate. Although the arm D may slide in a longitudinal direction along the arm $C_4$, it will also rotate together with the arm $C_4$; that is, when the arm $C_4$ rotates, the arm D rotates with it although the arm D may be moved in a rectilinear direction without moving the arm $C_4$. The arm D preferably is to be of transparent material having a visible line or hairline $D_3$ thereon. There is no necessity for a scale to appear on the arm D as the arm is used solely to locate coordinate points.

Heretofore, I have described the intersecting arms D and $C_4$, which intersect at right angles along the face of the plate A; and at the point of intersection of the arms D and $C_4$ is pivoted a rotatable arm, generally designated as E. The arm E is made of transparent material, such as lucite. The arm E is preferably three (3) inches in length, scaled to have a center line and divisions of each one-quarter ($1/4$) inch sub-divided in one-twentieth ($1/20$) inch intervals, which intervals denote one-fifth ($1/5$) of a division. Reading taken along the rotatable arm F may start at the pivoted point as the zero point of reference.

A locking member F may be on the angular index B or $B_1$ for purpose of locking the construction in position.

An Example of the Application of My Invention

The refractionist ordinarily obtains diagnostic readings of errors of refraction of each eye through the centers of so-called test lenses as part of a routine called subjective testing, see Fig. 8, line $L_1$. Either before or after this mode of testing, he makes routine objective readings independent of the patient's report, by means of other scientific instruments not disclosed herein and not part of the present invention. As part of a refractionist's procedure, he will make a careful determination of true departures of the eyes from normal physiologic behavior of the extra-ocular muscles. Often these departures are described as phorias, or tendencies to turn away from its normally related binocular position; and other departures may be described as tropias, or actual turning of one eye from its true course so as to be easily seen by an observer, and commonly described as a "crossed" eye. Any departure of the eyes from normal physiologic behavior is recorded upon the data sheet.

It is then the refractionist's problem to prescribe those lens elements, prisms, or combinations of them so that there shall be a restoration of normal physiologic binocular function. Having determined through his diagnosis the prescription, it remains for him to designate a system of lenses that will accomplish the desired result that he professionally knows will successfully achieve the result. Some important factors that enter into the desired lens elements depend upon (1) habits of the patient; (2) mental attitudes of the patient; (3) type of existing error in each eye; (4) the occupation of the patient; and (5) the summation of his professional diagnosis and judgment.

The prescription that intends to introduce bifocals, say, where the two eyes have dissimilar refractive and muscular errors, must take into account the prismatic effects of lenses into the bifocal zone if the two eyes are to function in a normal physiologic, binocular manner. It is the purpose of my instrument to determine, first, if no harmful prismatic effects will occur without further recourse. This cannot be done by mere inspection, as a rule. A methodical procedure of calculation of the actual prismatic effect of each element of each lens for that particular zone must be done. Any other attempt by the refractionist to write his prescription forthwith from his original findings will and must invite serious damage to the patient and to challenge the professional integrity and competence of the examiner.

For illustrative purposes, see Ex. I, I submit the following problem:

The final prescription is written by the refractionist:

Right eye +2.00 D. S. ( ) +3.00 D. C. axis 135 ( ) 2 prism-diopters, base down ( ) 3 prism-diopters base out Left eye —1.50 D. S. ( ) +3.00 D. C. axis 45 Add O. D. +2.00 D. S.

The brackets mean "combined with." Other definitions are as follows:

D. S. means "diopter sphere."
D. C. means "diopter cylinder."
O. D. means "right eye."
O. S. means "left eye."
O. U. means "both eyes."

By reason of a consideration of the factors (1–5) above given, I designate the zone of choice for the bifocal at eight millimeters (or 0.8 centimeter) down, and two millimeters (or 0.2 centimeter) in. These coordinates fix points of reference for which calculations must be made.

According to a basic law (Prentice's Rule) the prismatic effect is the product of the refracting power (F) times the departure or decentration or distance from the true optical center, equals the prismatic value in prism-diopters, symbolized thus $\Delta$. Since a sphere has a uniform radius of curvature, the instrument by its vector colored arrows 10R and 10G, 11R and 11G, 12R and 12G and 13R and 13G are reminders of the direction of the prismatic base effect for each lens; red (10R) is used for positive (+) and the color green (10G) is used for negative (—) values. The power arm $C_4$ has its longitudinal hair-line placed so that it intersects the center of the coordinates. The vector arrows, both horizontally and vertically, will accurately show the prism base directions.

The chief first use, however, for the instrument is to determine the prismatic effects of the cylindric elements, their magnitude and base directions in the vertical and in the horizontal meridian of each eye at the designated center of coordinates. This is because the refracting power of a cylinder varies from zero to its maximum. Either one determines the intermediate power of the cylinder for each necessary meridian of calculation and then determines the prismatic power of the lens at the center of coordinates through use of a system of trigonometric formulae, and the application of Prentice's Rule; or the refractionist may proceed directly to determine the prismatic effect at the center of coordinates in the direction of the cylinder's maximum power, and then resolve the vector into its vertical and horizontal components. The determination of the resolved vectors may be had by a system of trigonometric formulae and an application of Prentice's Rule.

Turning now to the use of the instrument illustrated in Figs. 1 to 7 for direct calculations in solving the above prescription, and remembering that the second zone of choice is 0.8 centimeter down and 0.2 centimeter in, for the spherical element (+2.00 D. S.) of the right eye (O. D.), I multiply this power times the decentration (0.8) centimeter down, and note that the "red" arrow IOR is directed upwards, Fig. 1, lower left-hand quadrant. This value of +2.00 multiplied by 0.8 is 1.6 prism-diopters, base up. Next, I multiply the power 2.00 by 0.2 and note for the right eye the red arrow IIR is directed outwards. This value is 0.4 prism-diopter, base out.

For the cylindric element +3.00 D. C. axis 135 (Fig. 3), again referring to the illustration, the index $B_1$ is swung to 135° from the zero point. The power arm $C_4$ has moved upon rotation of the index pointers B and $B_1$ automatically into meridian 45°. The axis arm B, $B_1$ has a clamp F, locking the setting for both axis and power arms.

Assuming that the zone of choice, as already stated, is eight millimeters down and two millimeters in, the zone finder, slide D, is moved in a direction at right angles to the power arm so that its hair-line intersects the coordinate point 8 millimeters down and 2 millimeters in in the lower left quadrant, its hair-line intersecting the designated center of coordinates to the left of the 90th meridian, as shown in Fig. 3.

The freely revolving arm E, also marked with a scale, is set parallel to the nearest vertical ruled lines on the face of the instrument so as to intersect the horizontal principal meridian 0–180° at right angles thereto. The readings of the prismatic effects, both vertical and horizontal, can then be read off simultaneously, the vertical magnitude of a "unit" cylinder being read on the scale of the revolving arm E, and the horizontal magnitude being read on the scale shown on the face of the instrument along the 0–180th meridian; the scale on arm E may be used for this latter reading if swung horizontally and parallel to a proximate horizontal line on the face of the instrument, intersecting the 90th meridian. At each reading, the vector directions (red arrows towards the center, and green arrows away from the center) are noted. In this problem, the vectors for the +3.00 cylinder are red in color, indicating the vertical prism is directed upward, and the horizontal prism is directed inward—the direction of convergence. These readings 0.3 vertical and 0.3 horizontal are multiplied by the power of the cylinder (+3.00) which gives 0.9 in the vertical and 0.9 in the horizontal. After these readings are noted, as on the attached form, Fig. 8, the instrument is cleared for a recording of the prismatic effects of the elements of the left eye, sphere and cylinder. Thus, in Fig. 1, the axis B—$B_1$ is set for 45°, the power arm at 135°; the zone finder's hair-line cuts the center of co-ordinates eight millimeters down and two millimeters in, and the rotatable arm E is in its vertical position for readings of the magnitude and direction in both the vertical and horizontal meridians for a unit cylinder.

The above explanation has been given for the right eye only. Now I shall calculate for the left eye where the refractionist has given the value (O. S.) —1.50=2.00+45

—1.50 multiplied by 0.8=1.20 base down
—1.50 multiplied by 0.2=0.3 base out

Moving the index B to 45°, as in Fig. 1, and sliding the arm D in its track $C_5$ until the coordinate 0.8 and 0.2 in the lower right quadrant is reached, the readings per unit on scale E is 0.3 V and 0.3 H, and these values multiplied by 2 give 0.6 vertical and 0.6 horizontal.

These readings having been recorded, as in the attached form, Ex. I, and from the recorded data on the attached form, the refractionist equalizes the vectors in the vertical meridians for both eyes by recording the actual difference required to produce that equalization; likewise, he equalizes the vectors in the horizontal meridians, so that the vectors will be alike in magnitude, and the direction of the vectors will be both in or both out, or where possible, totally extinguished. The difference in prism power necessary to effect these conditions for the horizontal meridian is likewise noted on the form herewith attached.

*Method of summations of Figs. 8 and 9*

For vertical summation of prismatic effects in each eye:

Of two quantities alike, add them, noting direction up or down.
Of two quantities unlike, subtract the least from the most, noting direction of the quantity that is most.
Similarly for three or more quantities.

For summation in the Total corridor of the prismatic effects of both eyes:

Of two quantities alike as to vertical direction—both up or both down—subtract the least from the most, noting amount and the eye for which the remainder is the most.
Of two quantities unlike as to vertical direction—one up and one down—add arithmetically, and indicate for which eye the prism is intended, vector up (base up) or vector down (base down).
Of two quantities alike as to horizontal direction—both in or both out—subtract arithmetically, and choose for the vector direction the eye for which the choice was made for the vertical meridian. Then symmetrize according to the first rules of summation above given.
Of two quantities unlike as to horizontal direction—one in and the other out, or vice versa—add arithmetically, and choose for the vector direction the eye for which the choice was made for the vertical meridian. Then symmetrize according to the first rules of summation above given.

The resultant is calculated with instrument, giving actual magnitude and direction of the required prism for the second zone.

It now remains to calculate a single prism called a resultant prism that will either wholly neutralize the effects of the vertical and horizontal prism differences, as above found, or as it may be modified through the refractionist's intent to correct a muscular (phoria or tropia) defect in the second zone of choice. Since the scaling is entirely uniform, it is a mere matter of using the face of the instrument to locate the terminus of the horizontal prism as a "center of coordinates," carefully taking into account the vector directions of the vertical difference and the horizontal difference as calculated for the second zone of choice. The power arm $C_4$ is then rotated so that its hair-line intersects the horizontal terminus, thereby automatically setting the base-apex line of the resultant prism on the circular scale in its required meridian. The magnitude and direction of the resultant prism is read directly on the power arm scale; that is, the distance between the zero point of said scale and the "center of coordinates," or terminus of the horizontal prism difference vector.

This constitutes the whole solution. The first process is one of analysis; the final process is one of synthesis.

From the data attached, it will be seen that an enormous prismatic difference exists as would cause the filled prescription to fail at the zone of choice as a binocular aid—(Example I). This analysis assumes no intended muscular correction. Example II shows that the intended muscular correction fails at the zone of choice, eight millimeters down and two millimeters in.

In each case, the synthetic method is shown in Figs. 8 and 9.

EXAMPLE I
*Fig. 8*

Right eye — +2.00=+3.00 axis 135°
Left eye — —1.50=+2.00 axis 45°

RIGHT EYE—SECOND ZONE OF CHOICE 8 millimeters down
2 millimeters in

| | V. | Position of base | H. | Position of base |
|---|---|---|---|---|
| Sphere | 2×0.8=1.6 | Up | 2×0.2=0.4 | Out |
| C. reading based on instrument. | 3×inst. reading of 0.3=0.9. | Up | 3×inst. reading of 0.3=0.9. | In |
| Total addition. | 2.50 | Up | 0.50 | In |

LEFT EYE

| | V. | Position of base | H. | Position of base |
|---|---|---|---|---|
| Sphere | 1.50×0.8=1.20 | Down | 1.50×0.2=0.3 | In |
| C. reading based on instrument. | 2.00×inst. reading of 0.3=0.60. | Up | 2.00×0.3=0.6 | In |
| Total addition. | 0.60 | Down | 0.9 | In |

In order to balance the vertical amounts in the horizontal Total corridor, I have 0.60 prism base down plus 2.50 prism base up=3.10 prism base up for the left eye, or the same sum base down for the right eye; and to symmetrize the horizontal, I have 0.50 prism base in plus 0.90 prism base in =0.4 prism base out, left eye, or the same sum base in for the right eye.

The resultant, or the single equivalent prism for 3.10 prism base up and 0.4 prism base out is found on the instrument as 3.15 prism base up and out at 84°; this prism resultant is calculated for the left eye. For the right eye, the resultant, or the single equivalent prism for 3.10 prism base down, and 0.4 prism base in is found on the instrument as 3.15 prism base down and in at 96°.

This method of addition is essentially vector addition in the vertical and horizontal meridians.

Vector quantities have magnitude and direction, whereas scalar quantities have magnitude only.

EXAMPLE II

The same spherical and cylindrical data as in Example I applies in Example II, with this difference: the prescription calls for a bifocal for the right lens, +3.00 D. S.; and for the left lens, +2.00 D. S.

I assume, as occurs in actual practice, that these bifocals are small lenses, having definite radius from the optical center to the edge of the segment. From this and other factors, not particular to my discussion, the prismatic effects of these segments may be calculated precisely as in the case of the spherical element of the lens in which the segment is imbedded.

Fixing the vertical departure from the center of the segment to the zone of co-ordinates eight millimeters down and two millimeters in as a departure of twelve millimeters (1.2 centimeters) the vertical prism for the right lens segment is 3.6 prism-diopters; for the left lens, it is 244 prism diopters—in each case the base is down.

For the right eye, the summation is 1.60 up plus 0.90 up minus 3.60 down, or a vertical total sum of 1.10 prism base down. For the left eye, the summation is 1.20 down plus 2.4 down minus 0.60 up, or a vertical total sum of 3.0 prism down. The horizontal effects are undisturbed by reason of the professional practice to displace the centers of the segment, or bifocal, inward to the center of coordinates.

The synthetic procedure, follows as before, by instrument. For the left eye, the resultant is the equivalent of the following:

Balancing the vertical components in the horizontal Total corridor, I have 1.9 prism base up in the left lens segment, or 1.9 prism base down in the right lens segment; the horizontal data remains unaffected, as in Example I, that is, the prismatic difference to be accounted for is 0.4 prism base out in the left eye, or 0.4 prism base in in the right segment.

For the right eye, at the designated center of coordinates, the resultant, or the single equivalent prism for 1.9 prism base down and 0.4 prism base in, is found on the instrument as 2.0 prism down and in at 98°; and the resultant for the left eye is 2.0 prism up and out at 82°.

It is to be remembered that these equated values are not for the entire lens but for the particular zone of choice away from the center. Methods exist for achieving the grinding of these prisms without impairing the original intent of the prescription for the central zone of each lens.

My invention may be utilized for resolving an ophthalmic prism prescribed for a setting at some oblique meridian into its horizontal and vertical components, showing the magnitude and direction of each prism base. This is accomplished by moving the power arm $C_1$ into the meridian prescribed, moving the arm $D_1$ along the power arm so that its hair-line intersects the hair-line on the power arm $C_1$ at the scale of prescribed prism power accordingly as the base is prescribed, i. e. in and up, in and down, out and up, out and down; then setting the rotatable arm F perpendicular to the 0–180th meridian. The vertical component is then read on the scale E at intersection on the 0–180th meridian. The horizontal component may then be read from that point of intersection to the center of the instrument, or zero of scale H. The vectors are read according to arrow representation or in accordance with the physicist's mode of vector representation and reading.

Examples of the utility of the color scheme for determining the vector directions of the prismatic effects by the analytical process are as follows:

Convergence into the lower left quadrant by the right eye at co-ordinates 10 mm. down, and 2 mm. in which is the selected secondary zone of choice.

For a plus spherical element, the system of red colored arrows on the face plate and on the power arm form the members of a closed vector triangle. The prismatic effects, for these data, are prism base up and prism base out (contrary to the direction of convergence).

For a negative (minus) spherical element, given the same data, the prismatic effects are those of the closed green triangle, and are read prism base down and prism base in (in the same direction of convergence).

For a plus cylindrical element, given the same data, the axis of cylindrical correction falling between 0 and 90 degrees, the prismatic effects are those of the closed red triangle, and are read prism base up and prism base out (contrary to the direction of convergence).

For a negative (minus) cylindrical element, given the same data, the axis of cylindrical correction falling between 0 and 90 degrees, the prismatic effects are those of the closed green triangle, and are read prism base down and prism base in (in the same direction of convergence).

For a plus cylindrical element, given the same data, the axis of cylindrical correction falling between 90 and 180 degrees, the prismatic effects are those of the closed triangle in the lower right quadrant, red in color, and are read prism base up and prism base in (in the same direction of convergence for the right eye).

For a negative (minus) cylindrical element, given the same data, the axis of cylindrical correction falling between 90 and 180 degrees, the prismatic effects are those of the closed green triangle, and are read prism base down and prism base out (contrary to the direction of convergence of the right eye).

The same color relationship applies accurately throughout and is shown to relate to the direction of convergence, the axis of cylindrical correction and the selected secondary zone of choice for which prismatic balance and/or symmetry is to be achieved.

Although my invention has been described in considerable detail, such description is intended as illustrative rather than limiting, since the invention may be variously embodied, and the scope of the invention is to be determined as claimed.

I claim as my invention:

1. An instrument for determining binocular prismatic values wherein a second zone of choice away from the optical center of each lens is selected comprising a base having intersecting horizontal and vertical lines thereon whereby the base is divided into four quadrants, a plurality of identical spacings on each of the horizontal and vertical lines forming unit scales, a scale on the circumference of the plate divided into two segments of 0°–180°, a first arm pivotally mounted about the center of plate and having thereon a scale of the same units as the horizontal and vertical scales, a second arm extending at right angles to said first arm and slidable upon said first arm, and a third arm pivotally mounted at the junction of said first named arm and said second arm, and a subdivision of said units of the same scale on said third arm.

2. An instrument for determining binocular prismatic values wherein a second zone of choice away from the optical center of each lens is selected, comprising a base having intersecting horizontal and vertical lines thereon whereby the base is divided into four quadrants, a plurality of identical spacings on each of the horizontal and vertical lines forming unit scales, a first arm pivotally mounted about the center of plate and having thereon a scale of the same units as the units of the horizontal and vertical scales, a second arm extending at right angles to said first arm and slidable upon said first arm, a third arm pivotally mounted at the junction of said first-named arm and said second arm, and a scale on said third arm having the same units as the units of the horizontal and vertical lines.

3. My invention as set form in claim 2 including distinguishable pairs of colored arrows, as red and green, on the face plate of the instrument and on its power arm; one color, as red, denoting positive (plus) lens values, and one color, as green, denoting negative (minus) lens values; said colors identify the direction arrows to be read in relation to the plus or minus values of the lens elements analyzed and in relation to the direction of convergence (or divergence) of the particular eye whose visual line projects into the selected secondary zone of choice for which the analysis is being made.

4. An instrument for determining binocular prismatic values for secondary zones of choice away from the optical center of the lens comprising a bed plate having a plurality of horizontal and vertical units thereon, intersecting horizontal and vertical lines upon said base wherein the base is divided into a plurality of quadrants, an analytical arm pivotally mounted about the intersection of said horizontal and vertical lines, an arm slidable upon said analytical arm and extending at right angles to said analytical arm, and a second arm pivotally mounted at the junction of said analytical arm and said slidable arm, said last-named arm having a scale thereon of units equal to the horizontal and vertical bed plate units.

5. My invention as set forth in claim 4 including distinguishable pairs of colored arrows, as red and green, on the face plate of the instrument and on its power arm; one color, as red, denoting positive (plus) lens values, and one color, as green, denoting negative (minus) lens values, said colors identify the direction arrows to be read in relation to the plus or minus values of the lens elements analyzed and in relation to the direction of convergence (or divergence) of the particular eye whose visual line projects into the selected secondary zone of choice for which the analysis is being made.

WILLIAM H. GLAZER.